United States Patent
Shoji et al.

(10) Patent No.: US 6,814,894 B2
(45) Date of Patent: Nov. 9, 2004

(54) LITHIUM-MANGANESE COMPLEX OXIDE, PRODUCTION METHOD THEREOF AND USE THEREOF

(75) Inventors: Takayuki Shoji, Shinnanyo (JP); Kazuaki Yamamoto, Tokuyama (JP)

(73) Assignee: Tosoh Corporation, Yamaguchi (JP)

( * ) Notice: Subject to any disclaimer, the term of this patent is extended or adjusted under 35 U.S.C. 154(b) by 290 days.

(21) Appl. No.: 10/075,765

(22) Filed: Feb. 15, 2002

(65) Prior Publication Data

US 2002/0158233 A1 Oct. 31, 2002

(30) Foreign Application Priority Data

Feb. 16, 2001 (JP) .................................... P.2001-039799

(51) Int. Cl.$^7$ .................. C01G 45/02; C01D 15/02; H01B 1/08; H01M 4/50
(52) U.S. Cl. .................... 252/518.1; 423/599; 429/224
(58) Field of Search .......................... 252/518.1, 578.1, 252/579.1, 521.2; 423/599, 594.16, 594.15, 600; 429/224, 231.95, 223, 221

(56) References Cited

U.S. PATENT DOCUMENTS

| | | | |
|---|---|---|---|
| 4,797,381 A | | 1/1989 | Bartek et al. |
| 5,948,565 A | * | 9/1999 | Kelder ........................ 429/224 |
| 6,114,064 A | * | 9/2000 | Manev et al. ................ 429/224 |
| 6,267,943 B1 | * | 7/2001 | Manev et al. ................ 423/599 |

FOREIGN PATENT DOCUMENTS

| | | | | |
|---|---|---|---|---|
| EP | 0 814 524 A | | 12/1997 | |
| EP | 1 035 075 A | | 9/2000 | |
| GB | 748417 A | | 5/1956 | |
| GB | 883228 A | | 11/1961 | |
| JP | 11-054155 | * | 2/1999 | .......... H01M/10/40 |
| JP | 11-071115 | * | 3/1999 | .......... C01G/45/00 |
| JP | 11-240721 | * | 9/1999 | .......... C01G/45/00 |
| JP | 11-339805 | * | 12/1999 | .......... H01M/4/58 |
| JP | 2000-159522 | * | 6/2000 | .......... C01G/45/00 |
| JP | 1 049187 | * | 11/2000 | .......... H01M/10/40 |

OTHER PUBLICATIONS

Section Ch, Week 200340; Derwent Publication Ltd., London, GB; AN 2002–619683;XP002245936.

Section Ch, Week 200335; Derwent Publications Ltd., London, GB; AN 2003–367770; XP002245937.

* cited by examiner

Primary Examiner—Yogendra N. Gupta
Assistant Examiner—Kallambella Vijayakumar
(74) Attorney, Agent, or Firm—Sughrue Mion, PLLC

(57) ABSTRACT

A lithium-manganese complex oxide represented by a formula $Li[Mn_{2-X-Y}Li_XM_Y]O_{4+\delta}$ (wherein M is at least one element selected from the groups IIa, IIIb and VIII of the 3rd and 4th periods, and $0.02 \leq X \leq 0.10$, $0.05 \leq Y \leq 0.30$ and $-0.2 \leq \delta < 0.2$), having a spinel crystalline structure of 0.22° or less of half value width of the (400) plane of powder X-ray diffraction by CuKα and an average diameter of crystal grains by SEM observation of 2 μm or less, and a spinel crystalline structure lithium-manganese complex oxide having a BET specific surface area of 1.0 m$^2$·g$^{-1}$ or less; production methods thereof; and a lithium secondary battery which uses the lithium-manganese complex oxide as the positive electrode active material are described.

6 Claims, No Drawings

LITHIUM-MANGANESE COMPLEX OXIDE, PRODUCTION METHOD THEREOF AND USE THEREOF

FIELD OF THE INVENTION

This invention relates to the improvement of lithium-manganese oxides, more particularly to a lithium-manganese complex oxide having a spinel crystalline structure, which is represented by a formula $\text{Li}[\text{Mn}_{2-X-Y}\text{Li}_X\text{M}_Y]\text{O}_{4+\delta}$ (wherein M is at least one element selected from the groups IIa, IIIb and VIII of the 3rd and 4th periods, and $0.02 \leq X \leq 0.10$, $0.05 \leq Y \leq 0.30$ and $-0.2 \leq \delta < 0.2$), wherein average diameter of crystal grains by scanning electron microscopic (SEM) observation is 2 μm or less and half value width of the (400) plane of powder X-ray diffraction by CuKα is 0.22° or less, and a lithium-manganese complex oxide having a spinel crystalline structure, wherein its BET specific surface area is 1.0 m²·g⁻¹ or less, and also to an Mn-M complex oxide slurry material which renders their production possible, a production method thereof and a lithium secondary battery which uses the lithium-manganese complex oxide as the positive electrode active material.

Since lithium secondary batteries have high energy density, their application to a broad range of fields is in progress as new type secondary batteries of the next generation, and studies on them, including those which were already put into practical use, are in progress with the aim of obtaining more higher performance.

Manganese-based materials are one of the promising materials, because the material manganese is abundant and inexpensive in view of resources and gentle with the environment.

BACKGROUND OF THE INVENTION

With the popularization of mobile machinery, great concern has been directed toward a small-sized, light weight and high energy density lithium secondary battery, and lithium ion batteries in which a carbonaceous material capable of charging and discharging lithium was used in the negative electrode have been put into practical use.

Though lithium-cobalt oxide (to be referred to as $\text{LiCoO}_2$ hereinafter) is mainly used in the positive electrode material of the current lithium ion batteries, cobalt materials are expensive so that development of its substitute material is expected.

Lithium-nickel oxide (to be referred to as $\text{LiNiO}_2$ hereinafter) and lithium-manganese spinel (to be referred to as $\text{LiMn2O}_4$ hereinafter) can be exemplified as the positive electrode material which can be substituted for $\text{LiCoO}_2$ and show a 4 V-class electromotive force, but $\text{LiMn}_2\text{O}_4$ is considered to be the most excellent positive electrode material for hybrid type electric car batteries and fuel cell auxiliary power supply, because it is abundant and inexpensive in view of resources, has low influence on the environment and can easily ensure safety when made into a battery, and vigorous research and development are being carried out with the aim of its practical use.

However, it has been pointed out that $\text{LiMn}_2\text{O}_4$ has a problem regarding high temperature stability, namely capacity reduction and preservation characteristics by charging and discharging at a high temperature, so that concern has been directed toward the resolution of this problem.

For example, $\text{Li}_X\text{Mn}_{(2-Y)}\text{Al}_Y\text{M}_Y\text{O}_4$ in which Al was doped to $\text{LiMn}_2\text{O}_4$ (Japanese Patent Laid-Open No. 289662/1992) and $\text{Li}[\text{Mn}_{2-X-Y}\text{Li}_X\text{Me}_Y]\text{O}_4$ wherein Me represents a metal (Japanese Patent Laid-Open No. 7956/1999) have been proposed, but their capacity maintaining ratio after 50 cycles of charge and discharge is 96% to the maximum, thus still leaving a room to be improved.

SUMMARY OF THE INVENTION

The object of the invention is to propose a lithium-manganese complex oxide having improved high temperature stability and a production method thereof and to provide a high output lithium secondary battery which uses this compound as the positive electrode active material.

As a result of intensive studies carried out with the aim of improving high temperature stability of $\text{LiMn}_2\text{O}_4$, namely charge and discharge cycle characteristics and preservation characteristics at a high temperature, it was found that a spinel crystalline structure lithium-manganese complex oxide represented by a formula $\text{Li}[\text{Mn}_{2-X-Y}\text{Li}_X\text{M}_Y]\text{O}_{4+\delta}$ (wherein M is at least one element selected from the groups IIa, IIIb and VIII of the 3rd and 4th periods, and $0.02 \leq X \leq 0.10$, $0.05 \leq Y \leq 0.30$ and $-0.2 \leq \delta \leq 0.2$), having a half value width of the (400) plane of powder X-ray diffraction by CuKα of 0.22° or less and an average diameter of crystal grains by SEM observation of 2 μm or less, and a spinel crystalline structure lithium-manganese complex oxide having a BET specific surface area of 1.0 m²·g⁻¹ or less, can be synthesized by producing in advance an Mn-M complex oxide slurry material by adding an alkali to a metal salt aqueous solution of M (M is at least one element selected from the groups IIa, IIIb and VIII of the 3rd and 4th periods) containing electrolytic manganese dioxide as the manganese material, while stirring the solution, then adding a lithium material thereto and baking the mixture in the air or in an atmosphere of high concentration oxygen (including pure oxygen atmosphere), namely in an atmosphere of from 18 to 100% oxygen concentration, and that a manganese-based lithium secondary battery having sharply improved high temperature stability, which can not be achieved with the conventional materials, can be constructed by the use of the compound as the positive electrode active material, thereby resulting in the accomplishment of the invention.

DETAILED DESCRIPTION OF THE INVENTION

The following describes the invention illustratively.

The invention is a spinel crystalline structure lithium-manganese complex oxide represented by a formula $\text{Li}[\text{Mn}_{2-X-Y}\text{Li}_X\text{M}_Y]\text{O}_{4+\delta}$ (wherein M is at least one element selected from the groups IIa, IIIb and VIII of the 3rd and 4th periods, and $0.02 \leq X \leq 0.10$, $0.05 \leq Y \leq 0.30$ and $-0.2 \leq \delta \leq 0.2$).

The compound of the invention is constituted with lithium, manganese, a metal element M (wherein M is at least one element selected from the groups IIa, IIIb and VIII of the 3rd and 4th periods) and oxygen, wherein lithium occupies the tetrahedral position of cubic closest oxygen packing, and manganese and the metal element M or lithium, manganese and the metal element M occupy the octahedral position thereof. Examples of the M include Mg, Ni, Al and Fe. In general, ratio of the number of tetrahedral position and octahedral position is 1:2, and when the ratio of lithium, manganese and metal element M occupying each site is within the range of the formula, they become a spinel crystalline structure oxide. In this case, the tetrahedral position is called 8a site, and octahedral position 16d site.

It is important that the lithium-manganese complex oxide of the invention contains at least one element selected from the groups IIa, IIIb and VIII of the 3rd and 4th periods, in addition to lithium, manganese and oxygen elements. The stability at high temperature is improved by containing these elements. It is essential that the content of these elements is $0.02 \leq X \leq 0.10$, $0.05 \leq Y \leq 0.30$ and $-0.2 \leq \delta \leq 0.2$ in the formula $Li[Mn_{2-X-Y}Li_XM_Y]O_{4+\delta}$. Sufficient high temperature stability can not be maintained when the value of X is smaller than this level, and high temperature stability can be maintained but sufficient charge and discharge capacity can not be obtained when it is larger than this level. Also, sufficient high temperature stability can not be maintained when the value of Y is smaller than this level due to small containing effect of the element M, and high temperature stability can be maintained but sufficient charge and discharge capacity can not be obtained when it is larger than this level.

The $\delta$ value showing the number of oxygen atoms is described as $-0.2 \leq \delta \leq 0.2$, however, the analytical measurement of $\delta$ value is very difficult, and the $\delta$ value is ordinarily described as "0".

It is essential that the lithium-manganese complex oxide of the invention has an average diameter of crystal grains by SEM observation of 2 $\mu$m or less and a half value width of the (400) plane of powder X-ray diffraction by CuK$\alpha$ of 0.22° or less. It is important that Li, Mn and M (M is at least one element selected from the groups IIa, IIIb and VIII of the 3rd and 4th periods) having different ion diameters are uniformly dispersed in the 16d site of spinel structure of the lithium-manganese complex oxide of the invention, because when they are uniformly dispersed, they become a single phase so that the half value width of powder X-ray diffraction becomes sufficiently small causing no problems, but when these elements are segregated, they become an aggregate of crystal grains having different lattice constants depending on their ion diameters so that they become an aggregate of spinel crystals having slightly different lattice constants and the half value width of powder X-ray diffraction increases. That is, since the half value width of powder X-ray diffraction is an index which shows irregularity of composition among crystal grains, the improving effect on high temperature stability by containing the element M can not fully be shown when the width is large.

According to the lithium-manganese complex oxide of the invention, it is essential that the average diameter of crystal grains by SEM observation is 2 $\mu$m or less and it is desirable that the BET specific surface area is 1.0 m$^2 \cdot$g$^{-1}$ or less. Since the crystal grains of lithium-manganese oxide have a property to perform grain growth via oxygen deficiency, crystal grains of 5 $\mu$m or more by SEM observation have frequent oxygen deficiency which spoil the high temperature stability. When the crystal grain diameter is 2 $\mu$m or less, there is substantially no influence of the oxygen deficiency, and it is particularly desirable that the crystal grains are uniformly present. On the other hand, when the crystal grains are small, the BET specific surface area becomes large and the contacting area with electrolytic solution is increased so that there is a tendency advantageous for high rate charge and discharge, but the high temperature stability is reduced and other properties such as workability at the time of electrode preparation and yield are worsened. Reduction of the BET specific surface area can be effected by enlarging the crystal grains, but satisfactory high temperature stability can not be obtained when the crystal grains are too large because of the same reasons. Thus, it is desirable that the average diameter of crystal grains is 2 $\mu$m or less and the BET specific surface area is 1.0 m$^2 \cdot$g$^{-1}$ or less.

As shown in the invention, the chemical composition is important in order to improve the high temperature stability, namely, not only a metal element M (M is at least one element selected from the groups IIa, IIIb and VIII of the 3rd and 4th periods) having hitherto been known is simply added, but also its hale value width of the (400) plane of powder X-ray diffraction is 0.22° or less, and it is particularly important that average diameter of crystal grains by SEM observation is 2 $\mu$m or less and the BET specific surface area is 1.0 m$^2 \cdot$g$^{-1}$ or less. By these factors, it becomes possible for the first time to obtain sufficient high temperature stability.

The lithium-manganese complex oxide of the invention can be produced using an Mn-M complex oxide slurry as the material produced by adding an alkali to a metal salt aqueous solution of M (M is at least one element selected from the groups IIa, IIIb and VIII of the 3rd and 4th periods) containing electrolytic manganese dioxide as the manganese material, while stirring the solution. The lithium-manganese complex oxide of the invention can be obtained by adding a lithium material thereto and baking the mixture in the air or in an atmosphere of high concentration oxygen (including pure oxygen atmosphere), namely in an atmosphere of from 18 to 100% oxygen concentration.

In synthesizing the lithium-manganese complex oxide of the invention, it is important to use electrolytic manganese dioxide as the manganese material. The electrolytic manganese dioxide generally has a large BET specific surface area of from about 30 to 40 m$^2$/g, and stirring this in a metal salt aqueous solution of M (M is at least one element selected from the groups IIa, IIIb and VIII of the 3rd and 4th periods), M can be uniformly adsorbed to its surface and can be immobilized on its surface by adding an alkali of aqueous ammonia solution, etc. The stirring may be carried out at room temperature or at a high temperature of equal to or lower than the boiling point of the aqueous solution. As the material of the metal element M to be used in the synthesis, any material can be used with the proviso that it is a water-soluble salt, and its examples include a nitrate and a sulfate. The thus produced Mn-M complex oxide slurry may be used as such, after drying or after baking to make it into an M-containing lower oxide such as $Mn_2O_3$ or $Mn_3O_4$.

As the lithium material to be used in the synthesis, any material can be used with the proviso that it is a compound such as lithium carbonate, lithium hydroxide, lithium nitrate, lithium acetate or lithium iodide, which starts the complex formation reaction with manganese oxide at a temperature of 500° C. or less, and they may be mixed by a dry method or by a wet method by making them into a slurry or solution, but in order to improve their mixing ability or solubility, it is particularly desirable to use a lithium material having an average grain diameter of 5 $\mu$m or less, more preferably 2 $\mu$m or less.

The baking for obtaining the lithium-manganese complex oxide of the invention is carried out in the air or in an atmosphere of high concentration oxygen (including pure oxygen atmosphere), namely in an atmosphere of from 18 to 100% oxygen concentration, and it is desirable that the baking temperature is within the range of 700° C. or more and 950° C. or less. A temperature lower than this requires considerably long period of time for sufficiently reducing the BET specific surface area, and a temperature higher than this is apt to cause abnormal growth of the crystal grains. In addition, since the lithium-manganese complex oxide has a property to release and absorb oxygen at the time of high temperature, it is further desirable to carry out cooling after the baking at a rate of 20° C. or less per 1 hour in view of the absorption of oxygen.

As the negative electrode of the lithium secondary battery of the invention, lithium metal, a lithium alloy and a compound in which lithium is charged in advance and which is capable of charging and discharging lithium can be used.

Though the lithium alloy does not limit the invention, for examples, lithium/tin alloy, lithium/aluminum alloy and lithium/lead alloy can be exemplified.

Though the compound capable of charging and discharging lithium does not limit the invention, for example, carbonaceous materials such as graphite and black lead, oxides of iron and oxides of cobalt can be exemplified.

In addition, though the electrolyte of the lithium secondary battery of the invention is not particularly limited, the electrolyte in which at least one of lithium salts such as lithium perchlorate, lithium tetrafluoroborate, lithium hexafluorophosphate and lithium trifluoromethanesulfonate is dissolved in at least one of organic solvents including carbonates such as propylene carbonate and diethyl carbonate, sulfolanes such as sulfolane and dimethyl sulfoxide, lactones such as γ-butyrolactone and ethers such as dimethyl sulfoxide, and inorganic and organic lithium ion conductive solid electrolytes can be used.

Examples are shown below as illustrative examples of the invention, but the invention is not restricted by these examples.

In this connection, the powder X-ray diffraction measurement in the examples of the invention and comparative examples was carried out by the method shown below.

Powder X-Ray Diffraction Measurement

Measuring Machine MXP3 mfd. by Mack Science

| | |
|---|---|
| Irradiation X ray | Cu Kα ray |
| Measuring mode | step scanning |
| Scanning condition | 0.04° as 2 θ |
| Measuring time | 5 seconds |
| Measuring range | from 5° to 80° as 2 θ |

Also, the BET specific surface area was measured by nitrogen adsorption method, and the average grain diameter by micro track.

[Production of Lithium-Manganese Complex Oxides]

EXAMPLE 1

(Synthesis of Li[Mn$_{1.85}$Li$_{0.05}$Mg$_{0.1}$]O$_4$)

As Example 1, synthesis of Li[Mn$_{1.85}$Li$_{0.05}$Mg$_{0.1}$]O$_4$ was carried out by the following method.

An 87 g portion of electrolytic manganese dioxide was put into 1 liter of magnesium sulfate 0.054 mol/l aqueous solution and stirred while heating at 80° C., 100 ml of 3% by weight aqueous ammonia was added dropwise thereto spending about 2 hours, and the mixture was further stirred for 4 hours, filtered and then dried. This was baked at 800° C. for 12 hours, mixed with a predetermined amount of lithium carbonate having an average grain diameter of 2 μm by a dry process and then baked at 800° C. for 24 hours. It was confirmed by powder X-ray diffraction measurement that the thus obtained compound has a spinel structure, and by SEM observation that the crystal grains are in octahedral plane shape and their sizes are uniform. A result of chemical composition analysis of the formed product, and its half value width of (400) plane, crystal grain diameter by SEM observation and BET specific surface area are shown in Table 1.

EXAMPLE 2

(Synthesis of Li[Mn$_{1.85}$Li$_{0.05}$Ni$_{0.1}$]O$_4$)

As Example 2, synthesis of Li[Mn$_{1.85}$Li$_{0.05}$Ni$_{0.1}$]O$_4$ was carried out by the following method.

An 87 g portion of electrolytic manganese dioxide was put into 1 liter of nickel sulfate 0.054 mol/l aqueous solution and stirred while heating at 60° C., 100 ml of 3% by weight aqueous ammonia was added dropwise thereto spending about 2 hours, and the mixture was further stirred for 4 hours, filtered and then dried. It was confirmed that the filtrate is colorless and transparent. This was mixed with a predetermined amount of lithium carbonate having an average grain diameter of 2 μm by a dry process and baked at 800° C. for 24 hours. It was confirmed by powder X-ray diffraction measurement that the thus obtained compound has a spinel structure, and by SEM observation that the crystal grains are in octahedral plane shape and their sizes are uniform. A result of chemical composition analysis of the formed product, and its half value width of (400) plane, crystal grain diameter by SEM observation and BET specific surface area are shown in Table 1.

EXAMPLE 3

(Synthesis of Li[Mn$_{1.80}$Li$_{0.05}$Al$_{0.15}$]O$_4$)

As Example 3, synthesis of Li[Mn$_{1.80}$Li$_{0.05}$Al$_{0.15}$]O$_4$ was carried out by the following method.

An 87 g portion of electrolytic manganese dioxide was put into 1 liter of aluminum sulfate 0.084 mol/l aqueous solution and stirred while heating at 90° C., 100 ml of 3% by weight aqueous ammonia was added dropwise thereto spending about 2 hours, and the mixture was further stirred for 4 hours, filtered and then dried. This was baked at 900° C. for 12 hours, mixed with a predetermined amount of lithium carbonate having an average grain diameter of 2 μm by a dry process and then baked at 900° C. for 24 hours. It was confirmed by powder X-ray diffraction measurement that the thus obtained compound has a spinel structure, and by SEM observation that the crystal grains are in octahedral plane shape and their sizes are uniform. A result of chemical composition analysis of the formed product, and its half value width of (400) plane, crystal grain diameter by SEM observation and BET specific surface area are shown in Table 1.

EXAMPLE 4

(Synthesis of Li[Mn$_{1.74}$Li$_{0.03}$Al$_{0.23}$]O$_4$)

As Example 4, synthesis of Li[Mn$_{1.74}$Li$_{0.03}$Al$_{0.23}$]O$_4$ was carried out in the same manner as in Example 3, except that excess amount of Li and added amount of Al were changed. A result of chemical composition analysis of the formed product, and its half value width of (400) plane, crystal grain diameter by SEM observation and BET specific surface area are shown in Table 1.

EXAMPLE 5

(Synthesis of Li[Mn$_{1.80}$Li$_{0.05}$Fe$_{0.15}$]O$_4$)

As Example 5, synthesis of Li[Mn$_{1.80}$Li$_{0.05}$Fe$_{0.15}$]O$_4$ was carried out by the following method.

An 87 g portion of electrolytic manganese dioxide was put into 1 liter of iron(II) sulfate 0.084 mol/l aqueous solution and stirred at room temperature. In this case, the supernatant was firstly light green of divalent iron when the stirring was suspended but became russet originated from trivalent manganese or trivalent iron ions after 1 hour of stirring. It was considered that this is due to oxidation-reduction reaction of divalent iron with manganese dioxide, and iron ions are strongly acting upon the surface of manganese dioxide grains. While stirring, to this was added dropwise 100 ml of 3% by weight aqueous ammonia spending about 2 hours, and the mixture was further stirred for 4 hours, filtered and then dried. The filtrate was colorless and transparent. This was baked at 800° C. for 12 hours, mixed with a predetermined amount of lithium carbonate having an average grain diameter of 2 $\mu$m by a dry process and then baked at 850° C. for 24 hours. It was confirmed by powder X-ray diffraction measurement that the thus obtained compound has a spinel structure, and by SEM observation that the crystal grains are in octahedral plane shape and their sizes are uniform. A result of chemical composition analysis of the formed product, and its half value width of (400) plane, crystal grain diameter by SEM observation and BET specific surface area are shown in Table 1.

EXAMPLE 6

(Synthesis of Li[Mn$_{1.80}$Li$_{0.05}$Mg$_{0.05}$Al$_{0.10}$]O$_4$)

As Example 6, synthesis of Li[Mn$_{1.80}$Li$_{0.05}$Mg$_{0.05}$Al$_{0.10}$]O$_4$ was carried out in the same manner as in Example 3, except that added amounts of Mg and Al were changed. A result of chemical composition analysis of the formed product, and its half value width of (400) plane, crystal grain diameter by SEM observation and BET specific surface area are shown in Table 1.

COMPARATIVE EXAMPLE 1

As comparative Example 1, Li[Mn$_{1.85}$Li$_{1.05}$Mg$_{0.10}$]O$_4$ was synthesized by weighing magnesium hydroxide, lithium carbonate and electrolytic manganese dioxide to obtain a composition similar to that of Example 1, mixing them by a dry process and then baking the mixture at 800° C. for 24 hours. It was found by SEM observation that the crystal grains were in well developed octahedral plane shape but they were a mixture of rough grains of 5 $\mu$m or more with fine grains of 1 $\mu$m or less. A result of chemical composition analysis of the formed product, and its half value width of (400) plane, crystal grain diameter by SEM observation and BET specific surface area are shown in Table 1.

COMPARATIVE EXAMPLE 2

As comparative Example 2, Li[Mn$_{1.80}$Li$_{0.05}$Mg$_{0.05}$Al$_{0.10}$]O$_4$ was synthesized by weighing aluminum hydroxide, lithium carbonate and electrolytic manganese dioxide to obtain a composition similar to that of Example 6, mixing them by a dry process and then baking the mixture at 900° C. for 24 hours. It was found by SEM observation that the crystal grains were in well developed octahedral plane shape but, similar to the case of Comparative Example 1, they were a mixture of rough grains of 5 $\mu$m or more with fine grains of 1 $\mu$m or less. A result of chemical composition analysis of the formed product, and its half value width of (400) plane, crystal grain diameter by SEM observation and BET specific surface area are shown in Table 1.

COMPARATIVE EXAMPLE 3

As comparative Example 3, Li[Mn$_{1.90}$Li$_{0.10}$]O$_4$ was synthesized by mixing electrolytic manganese dioxide and lithium carbonate by dry process and baking the mixture at 900° C. for 24 hours. It was found by SEM observation that the crystal grains were in well developed octahedral plane shape but, similar to the case of Comparative Example 1, they were a mixture of rough grains of 5 $\mu$m or more with fine grains of 1 $\mu$m or less. A result of chemical composition analysis of the formed product, and its half value width of (400) plane, crystal grain diameter by SEM observation and BET specific surface area are shown in Table 1.

TABLE 1

| | Chemical composition | Half value width of (400) plane (°/CuK$\alpha$) | Average diameter of crystal grains ($\mu$m) | BET (m$^2$·g$^{-1}$) |
|---|---|---|---|---|
| Example 1 | Li[Mn$_{1.85}$Li$_{0.05}$Mg$_{0.10}$]O$_4$ | 0.080 | <2 | 0.54 |
| Example 2 | Li[Mn$_{1.85}$Li$_{0.05}$Ni$_{0.10}$]O$_4$ | 0.120 | <2 | 0.82 |
| Example 3 | Li[Mn$_{1.80}$Li$_{0.05}$Al$_{0.15}$]O$_4$ | 0.160 | <2 | 0.51 |
| Example 4 | Li[Mn$_{1.74}$Li$_{0.03}$Al$_{0.23}$]O$_4$ | 0.200 | <2 | 0.58 |
| Example 5 | Li[Mn$_{1.80}$Li$_{0.05}$Fe$_{0.15}$]O$_4$ | 0.160 | <2 | 0.54 |
| Example 6 | Li[Mn$_{1.80}$Li$_{0.05}$Mg$_{0.05}$Al$_{0.10}$]O$_4$ | 0.080 | <2 | 0.48 |
| Comparative Example 1 | Li[Mn$_{1.85}$Li$_{0.05}$Mg$_{0.10}$]O$_4$ | 0.080 | >5 | 0.68 |
| Comparative Example 2 | Li[Mn$_{1.80}$Li$_{0.05}$Mg$_{0.05}$Al$_{0.10}$]O$_4$ | 0.240 | >5 | 1.38 |
| Comparative Example 3 | Li[Mn$_{1.90}$Li$_{0.10}$]O$_4$ | 0.240 | >5 | 0.54 |

[Constitution of Battery]

Each of the lithium-manganese complex oxides produced in Examples 1 to 6 and Comparative Examples 1 to 3 was mixed with a mixture of polytetrafluoroethylene and acetylene black as a conductive material (trade name: TAB-2) at a weight ratio of 2:1. A 75 mg portion of the resulting mixture was formed into pellets on a 16 mm$\phi$ mesh (SUS 316) under a pressure of 1 ton·cm$^{-2}$ and then dried under a reduced pressure at 200° C. for 2 hours.

A battery of 2 cm$^2$ in electrode area was constructed using this as the positive electrode, a piece of lithium cut out from a lithium foil (0.2 mm in thickness) as the negative electrode and using an organic electrolytic solution prepared by dissolving lithium hexafluorophosphate in a 1:2 volume ratio mixed solvent of propylene carbonate and dimethyl carbonate, to a concentration of 1 mol·dm$^{-3}$ as the electrolytic solution.

The capacity maintaining ratio (capacity after 50 cycles/capacity after 10 cycles) at 50° C. is shown in Table 2.

TABLE 2

| | Capacity maintaining ratio % | Deterioration ratio % |
|---|---|---|
| Example 1 | 99.4 | 0.6 |
| Example 2 | 99.3 | 0.7 |
| Example 3 | 99.5 | 0.5 |
| Example 4 | 99.6 | 0.4 |
| Example 5 | 99.4 | 0.6 |
| Example 6 | 99.6 | 0.4 |
| Comparative Example 1 | 97.2 | 2.8 |
| Comparative Example 2 | 97.8 | 2.2 |
| Comparative Example 3 | 95.1 | 4.9 |

Each of the lithium-manganese complex oxides synthesized in Examples 1 to 6 showed a high high-temperature stability with a deterioration ratio (=100−capacity maintaining ratio) of less than 1%. On the other hand, the lithium-manganese complex oxides synthesized in Comparative Examples 1 and 2 also gave high high-temperature stability in comparison with Comparative Example 3 showing the adding effect of M, but the deterioration ratio was 2% or more.

As has been described in the foregoing, it was found that a lithium-manganese complex oxide represented by a formula $Li[Mn_{2-X-Y}Li_XM_Y]O_{4+\delta}$ (wherein M is at least one element selected from the groups IIa, IIIb and VIII of the 3rd and 4th periods, and $0.02 \leq X \leq 0.10$, $0.05 \leq Y \leq 0.30$ and $-0.2 \leq \delta \leq 0.2$), having a spinel crystalline structure of 0.22° or less of half value width of the (400) plane of powder X-ray diffraction by CuKα and an average diameter of crystal grains by SEM observation of 2 μm or less, and a spinel crystalline structure lithium-manganese complex oxide having a BET specific surface area of 1.0 $m^2 \cdot g^{-1}$ or less, can be synthesized by producing in advance an Mn-M complex oxide slurry by adding an alkali to a metal salt aqueous solution of M (M is at least one element selected from the groups IIa, IIIb and VIII of the 3rd and 4th periods) containing electrolytic manganese dioxide as the manganese material, while stirring the solution, then adding a lithium material thereto and baking the mixture in the air or in an atmosphere of high concentration oxygen (including pure oxygen atmosphere), namely in an atmosphere of from 18 to 100% oxygen concentration, and that a manganese-based lithium secondary battery having sharply improved high temperature stability, which can not be achieved with the conventional materials, can be constructed by the use of the compound as the positive electrode active material of the lithium secondary battery.

What is claimed is:

1. A lithium-manganese complex oxide having a spinel crystalline structure, which is represented by a formula $Li[Mn_{2-X-Y}Li_XM_Y]O_{4+\delta}$, wherein M is at least one element selected from the groups IIa, IIIb and VIII of the 3rd and 4th periods, and $0.02 \leq X \leq 0.10$, $0.05 \leq Y \leq 0.30$ and $-0.2 \leq \delta \leq 0.2$, wherein half value width of the (400) plane of powder X-ray diffraction by CuKα is 0.22° or less, and average diameter of crystal grain's by SEM observation is 2 μm or less.

2. The lithium-manganese complex oxide having a spinel crystalline structure as claimed in claim 1, wherein M is one metal selected from the group consisting of Mg, Ni, Al and Fe.

3. The lithium-manganese complex oxide having a spinel crystalline structure as claimed in claim 1, wherein BET specific surface area is 1.0 $m^2 \cdot g^{-1}$ or less.

4. The lithium-manganese complex oxide having a spinel crystalline structure as claimed in claim 2, wherein BET specific surface area is 1.0 $m^2 \cdot g^{-1}$ or less.

5. The lithium-manganese complex oxide having a spinel crystalline structure as claimed in claim 1 wherein BET specific surface area is 0.82 $m^2 \cdot g^{-1}$ or less.

6. The lithium-manganese complex oxide having a spinel crystalline structure as claimed in claim 1, wherein when used as the positive electrode in a lithium secondary battery, the lithium secondary battery has a maintaining ratio of 99% or more after 50 cycles of charge and discharge using at least one substance selected from lithium, lithium alloys and compounds capable of charging and discharging lithium as the negative electrode, in combination with a non-aqueous electrolyte as the electrolyte.

* * * * *